US005517903A

United States Patent [19]
Kaufman

[11] Patent Number: 5,517,903
[45] Date of Patent: May 21, 1996

[54] COLLAPSIBLE AND PORTABLE CHAFING DISH

[76] Inventor: Kenneth L. Kaufman, 6903 Amestoy Ave., Van Nuys, Calif. 91406

[21] Appl. No.: 333,854

[22] Filed: Nov. 3, 1994

[51] Int. Cl.$^6$ .............................. F24C 1/16; A47J 27/00
[52] U.S. Cl. ........................... 99/449; 126/9 R; 126/40; 126/39 B
[58] Field of Search ..................... 99/483, 449; 126/9 A, 126/9 R, 377, 33, 40, 39 E, 39 B, 44, 43, 9 R, 246

[56] References Cited

U.S. PATENT DOCUMENTS

| | | | |
|---|---|---|---|
| 3,841,298 | 10/1974 | Sellors | 126/9 A |
| 4,126,116 | 11/1978 | McCallum | 126/9 R |
| 4,363,313 | 12/1982 | Smith | 126/9 R |
| 4,714,013 | 12/1987 | Telfer | 99/449 |
| 4,920,873 | 5/1990 | Stevens | 99/449 |
| 5,287,800 | 2/1994 | Orednick | 99/449 |

*Primary Examiner*—David Scherbel
*Assistant Examiner*—Reginald L. Alexander

[57] ABSTRACT

A rugged, flatly folding, portable chafing dish assembly is comprised of a cover, food pan, water pan, collapsible stand and heat source. The collapsible stand is rectangular and is comprised of four rigid plates forming the sides of the rectangular stand which are rotatably coupled together by means of a flatly folding piano hinge. The hinge is integrally formed with the sides and can be disassembled for cleaning. The two lateral sides of the stand are identical and interchangeable, as are the two end sides. The rectangular stand is provided with apertures through the lateral and end sides, both for air access to create a heat draft for the burner source when placed within the stand, as well as access to the burners when the chafing dish assembly is assembled. A rigid rectangular tray extends the length of the stand and connects to the end sides along an access aperture edge thereby rendering the otherwise collapsible rectangular stand rigid. Additional rigidity of the chafing dish assembly is realized when the water pan and food pan are disposed in the stand in as nested fashion.

11 Claims, 5 Drawing Sheets

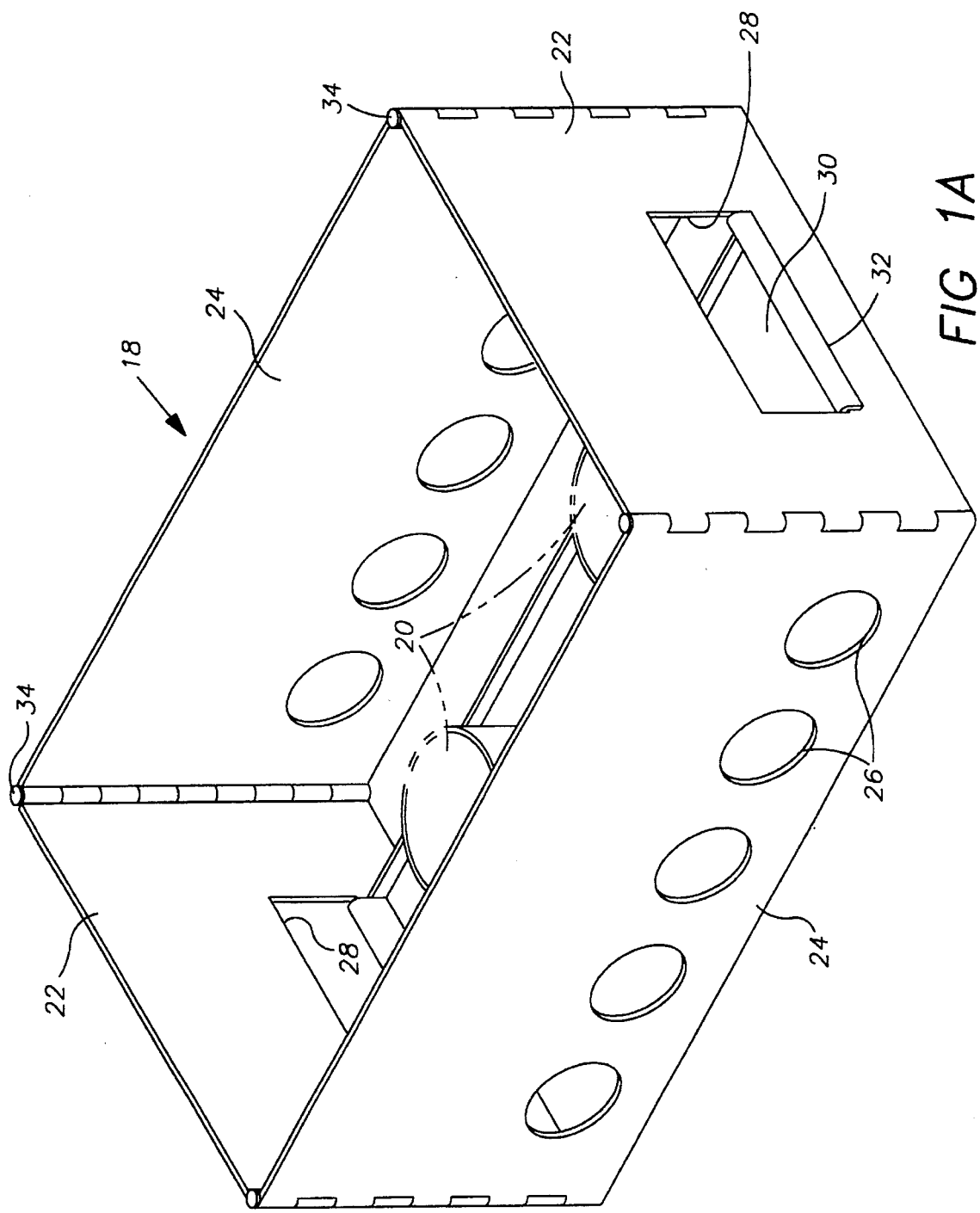

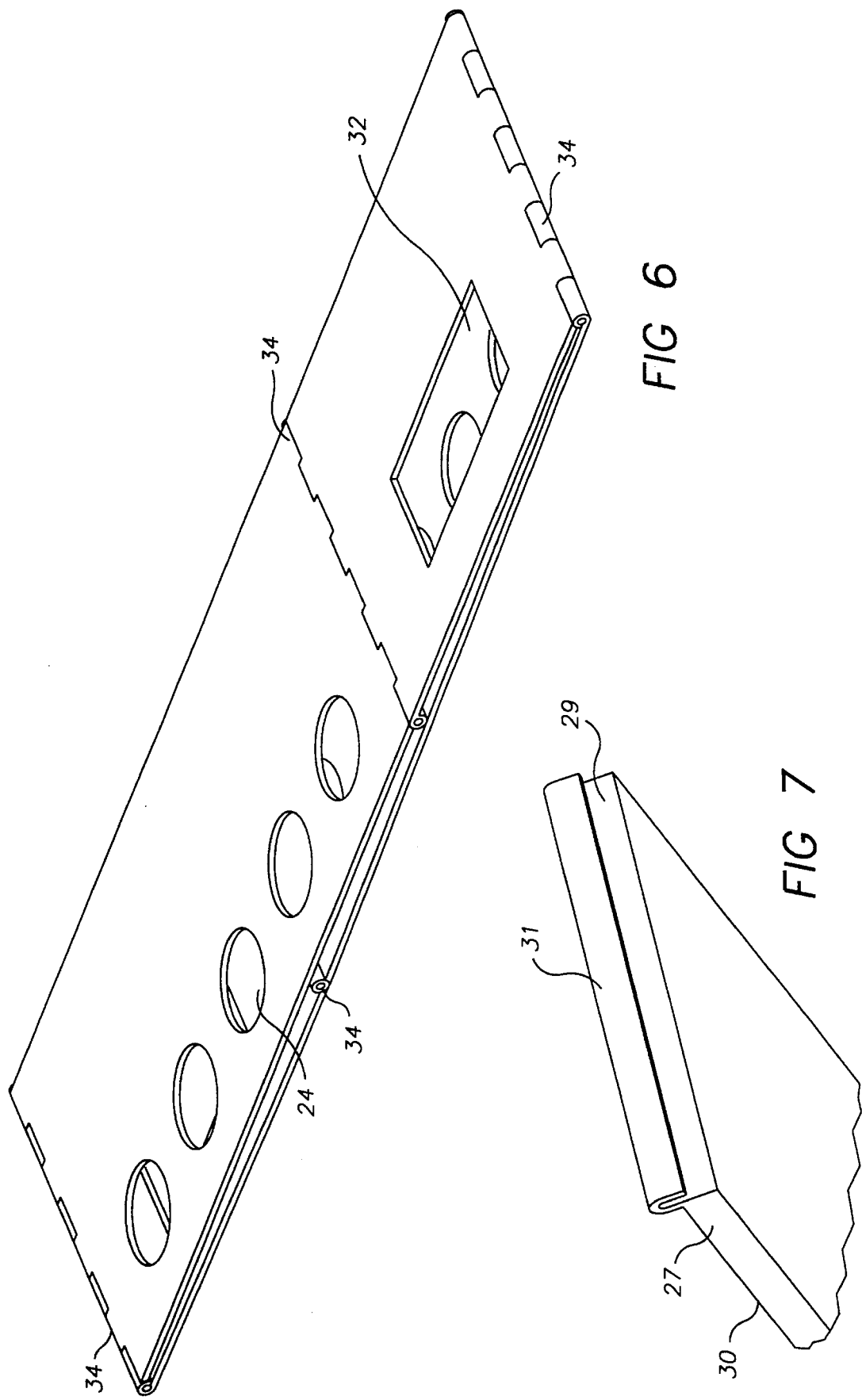

COLLAPSIBLE AND PORTABLE CHAFING DISH

BACKGROUND OF THE INVENTION

1. Field of the Invention

The invention relates to the field of catering apparatus, and in particular, to a portable, collapsible chafing dish.

2. Description of the Prior Art

Food catering services typically serve the prepared foods from a buffet line from a plurality of chafing dishes or trays which are typically comprised of a stand for holding a double-boiler pan and for positioning a heat source under the double-boiler pan. The double-boiler pan is partially filled with water and a serving dish is nested within it. The serving may also be provided with a cover. In this manner, heat from the heat source, typically a candle or a fuel can, such as manufactured under the trademark, STERNO, is used to transfer heat to the water in the double-boiler pan from whence it is transferred through vapor convection to the serving pan and the food therein.

The chafing dishes are expensive to manufacture, and even when robustly made, generally have a limited life due to repeated or rough handling. This is particularly the case in the application of mobile catering where the chafing dishes must be transferred from a storage space in the catering kitchen, to the catering truck, transported to the catering site and then set up on the buffet table at the catering site. After the catering service is rendered, the process is reversed. Repeated rough handling in this type of environment eventually results in damage to the chafing dish.

In the case where the chafing dish has been made portable by having collapsible design so that storage of multiple chafing dishes within the limited space of the catering truck is facilitated, the design which permits portability generally compromises its structural rigidity and robustness. Therefore, portable and collapsible chafing dishes have even a more limited life time in catering applications than the more bulky and noncollapsible rigid chafing dishes.

Several types of collapsible chafing dishes or cooking implements have been devised. Lee, "Cooking Utensil," U.S. Pat. No. 4,106,486 (1978) shows a cooking utensil comprising a bottom pan 10, and inner pan 30 which fits into bottom pan 10. A space is provided between the walls of inner pan 30 and the opposing walls of bottom pan 10. A cover 12 for bottom pan 10 and inner pan 30 is also provided. Inner pan 30 includes a perforated bottom 31, perforated opposing side walls 32 and 33 and perforated opposing end walls 35 and 36. Handles 39 and 40 are attached to side walls 35 and 36 respectively. End walls 35 and 36 are hinged at the lower corners to the side walls by pivot pins 38. The open configuration of pan 30 is illustrated in FIG. 4. Lee shows a nested set of pans with covers that included at least one foldable side on one of the pans.

Martin, "Collapsible Baking Pan," U.S. Pat. No. 3,828,966 (1974) shows a baking pan 10 in FIG. 1 which is comprised of base 11 and four sides 12–15 each of which are hinged by hinges 16 to base 11. The hinges include fold out support 17 shown in side view in FIG. 4 and in prospective view in FIG. 3. Each support 17 includes a laterally extending number 18 having a hinged upstanding member 19 which hold sides 12–15 in place when the sides are in a closed position. The baking pan is formed from light weight material such as aluminum. While relevant for showing a hinged pan, Martin does not suggest a nested pan within a foldable hinged chafing body.

Kratz, "Baking Pan," U.S. Pat. No. 1,714,379, (1929), shows a baking pan having a bottom 1 each side of which is provided with a cylindrical roll 2, side walls 4 and end walls 5. Each side has a lower end provided with a U-shaped extension 6 which is adapted to be received within roll 2 so that each side wall 4 and end wall 5 is hinged to bottom 1. The ends of side walls 4 and rolled about a reinforcing wire 8, seen in FIG. 2, while ends of end walls 5 are shaped to provide a cylindrical rolled extension 9 which receive the rolled ends of side walls 4.

While Kratz is relevant for showing a collapsible rectangular unit, Kratz fails to suggest a combination with a chafing pan and moreover would have to be materially modified to eliminate the bottom side 1.

Lewitzky, "Baking Pan," U.S. Pat. No. 1,261,566 (1918) shows a baking pan having a bottom 6 with an up-standing side and end flanges 7 and 8 respectively, side walls 10 and end walls 13. Each wall has a lower end which is hinged to the respective side. In addition, and hinged flange and latch 20 are pivotally connected to a flange 15, seen in FIG. 1 of each end wall 13. Latch 20 is received by a loop 23 in each side wall 12. Lewitzky is relevant for showing the construction of a collapsible pan although not in an overall combination in chafing pan.

What is needed, therefore, is a chafing dish which can be compactly stored and transported, but which is of such a design that it is neither bulky or prone to damage by ordinary rough handling. A portable collapsible chafing dish which folds flatly or compactly to facilitate storage in limited space of multiple units of the chafing dish is needed.

BRIEF SUMMARY OF THE INVENTION

The invention is a chafing dish assembly comprising a lid, a food pan coverable by the lid, a water pan into which the food pan nests, and a collapsible stand into which the water pan nests. The collapsible stand is comprised of four sides forming a rectangular structure. Each adjacent side is coupled together by element of a flatly folding hinge. A structural element is provided for temporarily rendering the collapsible stand rigid. In the preferred embodiment, this element is a tray for holding and positioning the burners. As a result, a rugged, easily stored, collapsible chafing dish assembly is provided.

The hinge between each of the sides of the stand is integrally formed with each side. The stand has two opposing lateral sides and two opposing end sides. The lateral sides are provided with a plurality of apertures defined therethrough to promote air draft.

The element for rendering the stand rigid comprises a rectangular tray temporarily attachable along ends of the tray with opposing sides of the chafing assembly. Each of the end sides are provided with a rectangular aperture. The rectangular tray has an end flange at each end of the rectangular tray which end flange is arranged and configured to slip-fit over an edge of the rectangular aperture defined in each the end side. A heat source is disposable within the stand to provide heat to the water pan. The tray provides support for the heat source to position the heat source appropriately with respect to the water pan and to maintain the heat source in a position spaced above bottom of the stand. Apertures are defined in the end sides provide physical access to the heat source within the stand.

The lateral and end sides are interchangeable and identical. This facilitates easy repair and replacement. The sides comprise a wind-sheltered enclosure into which the heat source is placed. In the preferred embodiment the sides fold flatly to a thickness of no more than one-half inch.

The invention may be better visualized by now turning to the following drawings wherein like elements are referenced by like numerals.

BRIEF DESCRIPTION OF THE DRAWINGS

FIGS. 1A & 1B are exploded perspective views of a chafing dish assembly using the collapsible stand of the invention.

FIG. 6 is a perspective view of the collapsible stand of FIGS. 1–5 shown in a collapsed or flatly folded configuration.

FIG. 7 is an end perspective view in enlarged scale of the burner tray used in the collapsible stand of the invention.

These and additional embodiments of the invention may now be better understood by turning to the following detailed description wherein an illustrated embodiment is described.

DETAILED DESCRIPTION OF THE PREFERRED EMBODIMENTS

A rugged, flatly folding, portable chafing dish assembly is comprised of a cover, food pan, water pan, collapsible stand and heat source. The collapsible stand is rectangular and is comprised of four rigid plates forming the sides of the rectangular stand which are rotatably coupled together by means of a flatly folding piano hinge. The hinge is integrally formed with the sides and can be disassembled for cleaning. The two lateral sides of the stand are identical and interchangeable, as are the two end sides. The rectangular stand is provided with apertures through the lateral and end sides, both for air access to create a heat draft for the burner source when placed within the stand, as well as access to the burners when the chafing dish assembly is assembled. A rigid rectangular tray extends the length of the stand and connects to the end sides along an access aperture edge thereby rendering the otherwise collapsible rectangular stand rigid. Additional rigidity of the chafing dish assembly is realized when the water pan and food pan are disposed in the stand in as nested fashion.

Figure 1B:
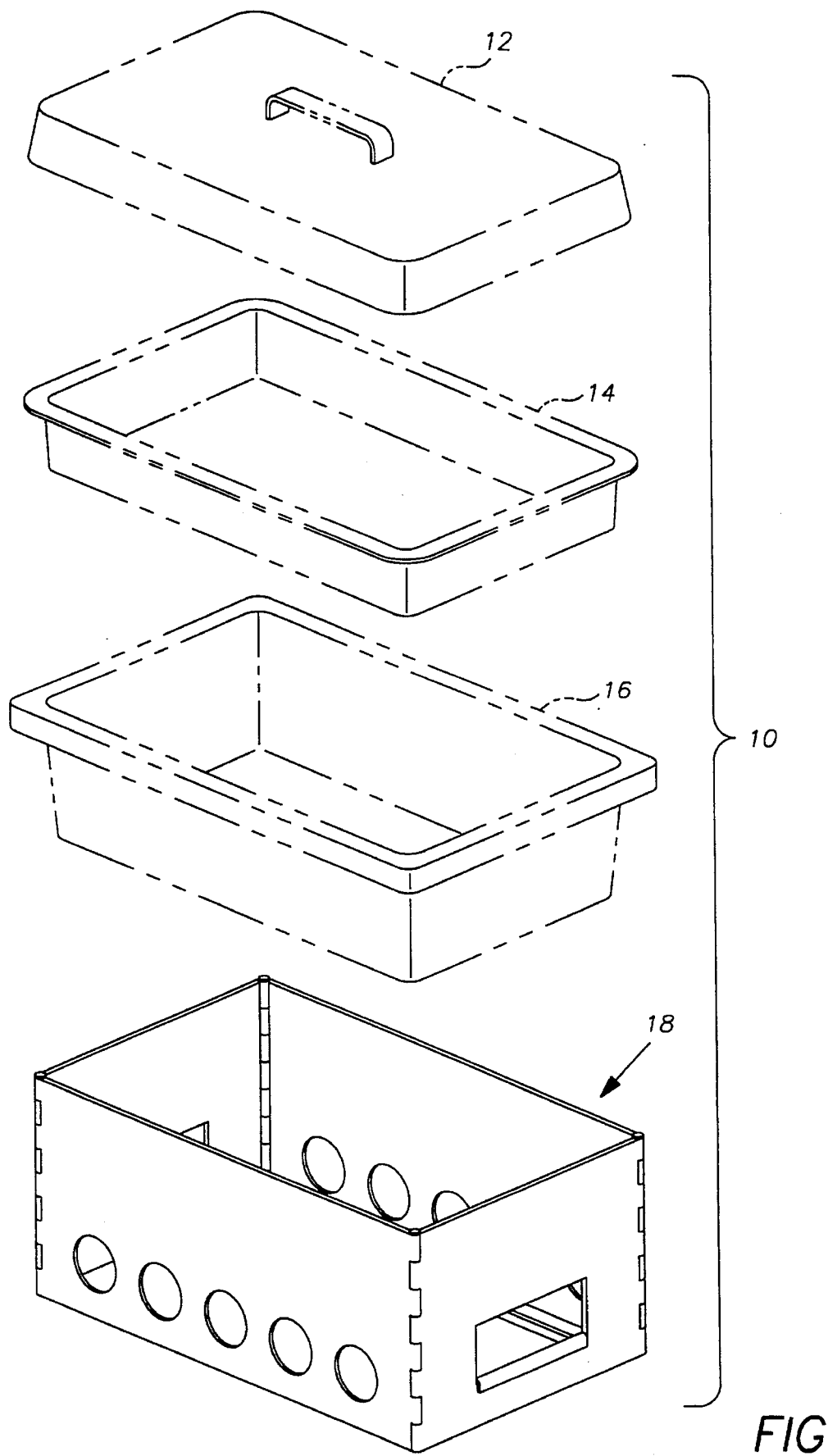

FIG. 1 is an exploded perspective view showing the chafing dish assembly, generally denoted by reference numeral 10. Chafing dish assembly 10 is comprised of a cover 12, food pan 14, water pan 16, collapsible stand 18 and heat source 20. Each of the elements comprising chafing dish assembly 10 is preferably made of metal. Commonly used materials include stainless steel and aluminum. In some applications, plated metals, such as silver, brass, gold or copper, may be employed for decorative effect.

As shown in FIG. 1, water pan 16 slips on top of and is held by collapsible stand 18 in a manner similar to conventional chafing dish assemblies. When the curved lips of water pan 16 are placed on and extend over the upper edges of collapsible stand 18 some additional rigidity is provided to collapsible stand 18 in its expanded configuration by pan 16. The main structural reinforcement of stand 18 is provided, however, by means of tray 30 described below. Preferably, stand 18 is rigidly maintained in its expanded configuration before water pan 16 is placed upon it.

Heat source 20 is placed within collapsible stand 18 in the manner described in greater detail below to provide heat to water which is placed in water pan 16 which then acts as a double-boiler. Food pan 14 then nests into water pan 16 and is supported by the top edges of water pan 16 in a conventional manner. The depth of food pan 14 is less than the depth of water pan 16, thereby providing a space for the heated water reservoir and steam between food pan 14 and water pan 16. Cover 12 is placed on and completely covers food pan 14 to further retain heat and water within the food as well as to keep foreign matter out. To the extent thus far described, the elements of chafing assembly 10 are conventional with the exception of collapsible stand 18.

Collapsible stand 18 is unique to the invention, and as shown in FIG. 1, is comprised of four hinged rigid sides, namely ends 22 and lateral sides 24, which collectively form a rectangular stand into which water pan 16 nests. Lateral sides 24 are provided with a plurality of openings 26, which are shown in the embodiment of FIG. 1 as circular apertures. It is to be understood that the number and shape of openings 26 may be varied according to decorative and arbitrary design choices. The basic function of openings 26 are not only to lighten collapsible stand 18, but also to provide adequate air draft for heat sources 20.

Ends 22 in the illustrated embodiment are each provided with large rectangular apertures 28, which also provide air to heat source 20, provide physical access to the interior collapsible stand 18 and hence to heat source 20, as well as serve to lighten collapsible stand 18.

A burner tray 30 extending the length of collapsible stand 18 is disposed into collapsible stand 18 and is provided at each end with a capturing lip 32 which rests on and extends over the lower edge of end aperture 28 as best depicted in FIG. 7. Burner tray 30 is a rigid rectangular tray in which one or more heat sources 20 may be placed. In addition to providing support and positioning for the burners, tray 30 is the structural element of collapsible stand 18 which renders it rigid. With tray 30 removed, collapsible stand 18 is free to fold completely flatly as permitted by hinges 34 at each of the wall connections. Because of the freely rotatable hinge connection, collapsible stand 18 thus folds out loosely and does not assume a rigid rectangular shape until tray 30 is placed into it and connected by overhanging flanges 32 to the lower edges of apertures 28. Once tray 30 is thus positioned, collapsible stand 18 assumes a surprisingly rigid configuration. Thereafter burner 20 is disposed on tray 30 and then water pan 16 on stand 18.

It is expressly contemplated that end apertures 28 may be modified in both size and shape according to the application at hand. For example, apertures 28 may be replaced by horizontal slots only large enough to accommodate end flanges 32 of tray 30 to fix collapsible stand 18 in rigid form, and also to provide a bearing surface for heat sources 20 above the surface on which collapsible stand 18 may be placed.

In the illustrated embodiment, heat sources 20 are STERNO-type fuel cans, namely, openable tins or cans filled with a burnable jelly, each included in a cup holder with adjustable lids, as is conventional. Any type of heat source may be employed in addition to a STERNO can without departing from the spirit and the scope of the invention.

Tray 30 may also be modified to accommodate heat source 20, for example, by providing a series of conforming indentations in tray 30 into which STERNO cup holders of heat source 20 may be placed and retained.

Figure 3:
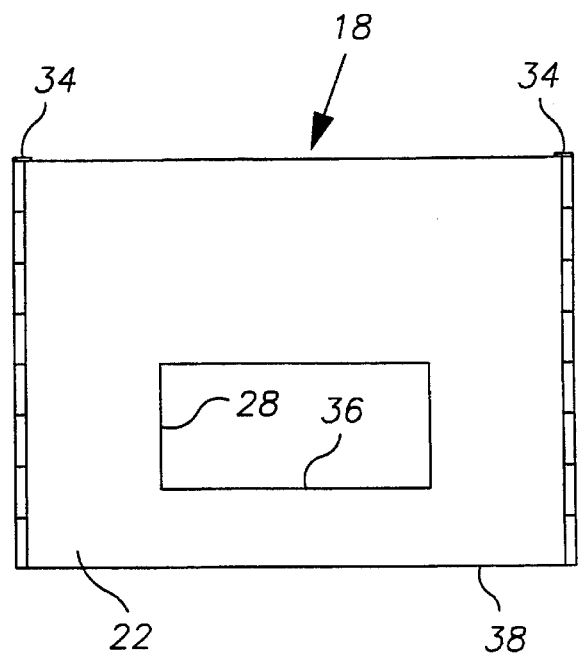
FIG. 3 is a plan elevational end view of the collapsible stand used in FIGS. 1 and 2.
Figure 2:
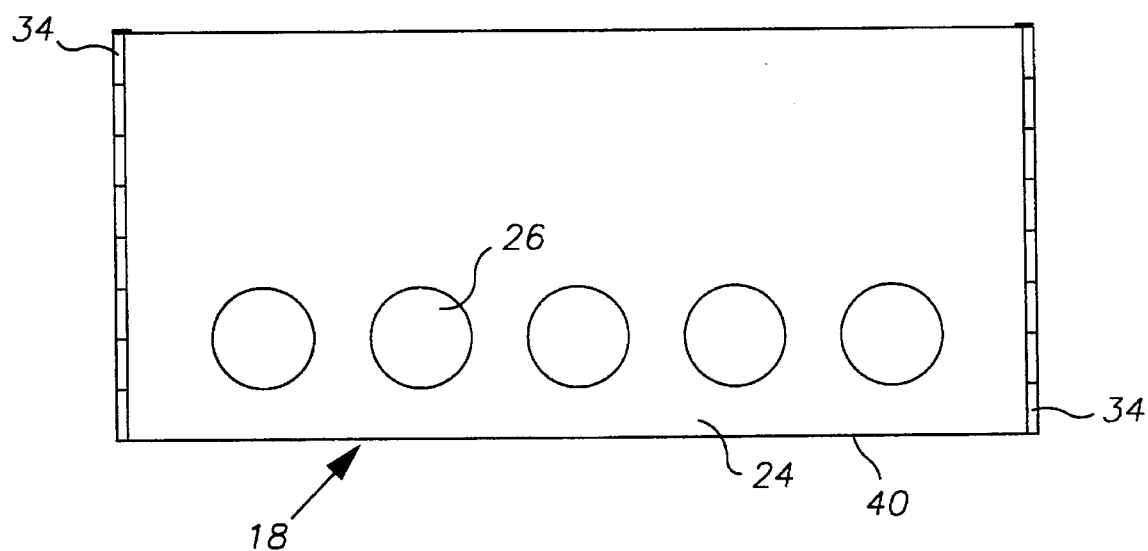
FIG. 2 is a side plan view of the collapsible stand used in FIG. 1.

FIG. 2 illustrates a side plan view of collapsible stand 18, while FIG. 3 is a plan end view of collapsible stand 18. In the illustrated embodiment, lateral side 24 is comprised of ⅛-inch aluminum plate, and has a length of approximately 20.5 inches. The height of lateral side 24 and ends 22 is approximately 9 inches. Apertures 26 are approximately 2 inches in diameter and provided on 3-inch centers. In the view of FIG. 2, the centerline of aperture 26 is approximate 3 inches from the bottom of lateral side 24. End aperture 28 as shown in FIG. 3, is approximately 6 inches in length and 4¼ inches in height. Bottom edge 36 is approximately 1¾ inches from bottom edge 38 of end 22.

Figure 4:
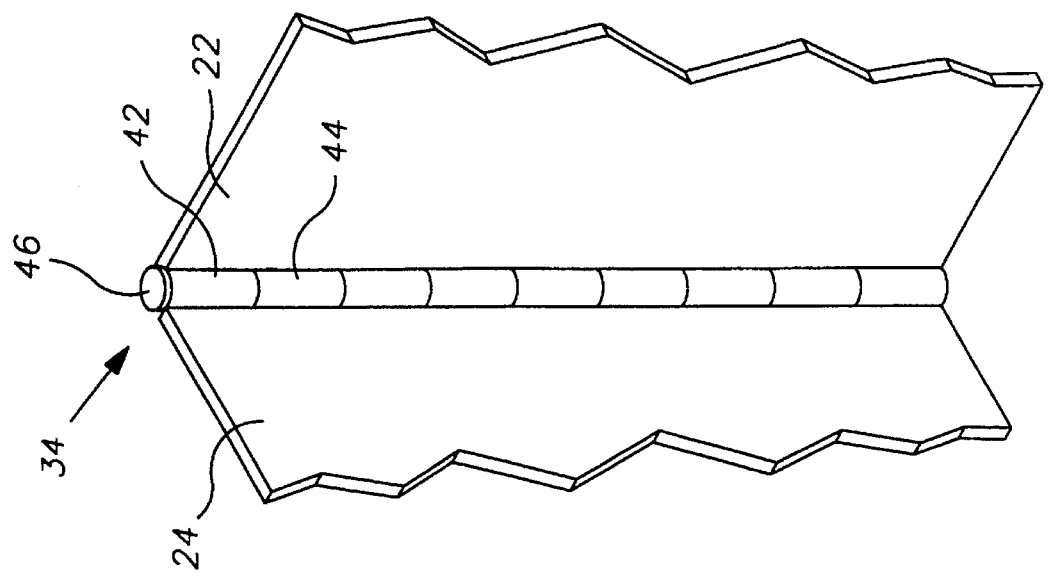
FIG. 4 is a perspective view of one hinged corner of the collapsible stand used in FIGS. 1–3 shown in enlarged scale in an assembled configuration.
Figure 5:
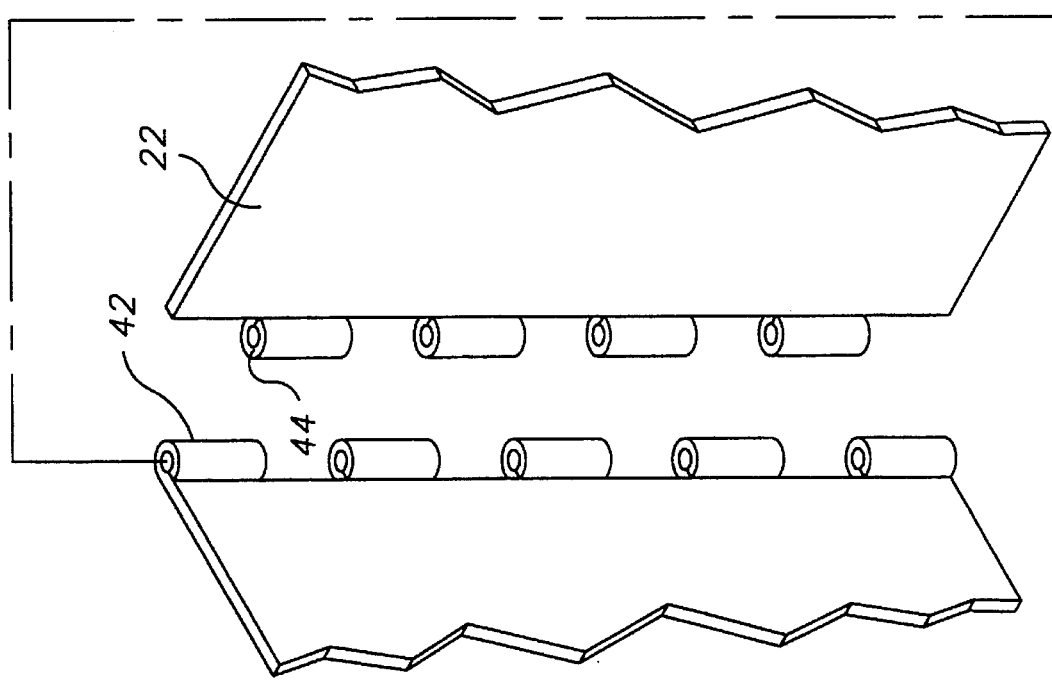
FIG. 5 is a perspective view of one hinged corner of the collapsible stand used in FIGS. 1–3 shown in enlarged scale in an unassembled configuration.

As best shown in the perspective views of FIGS. 4 and 5, the hinge, generally denoted by reference numeral 34, is comprised of a first plurality of sleeves 42 which are integrally formed from lateral side 24. A second plurality of sleeves 44 are similarly integrally formed in end 22. Sleeves 42 and 44 are configured to interleave with each other to form a conventional columnar sleeve structure, such as depicted in FIG. 4, through which hinge pin 46 is disposed as shown in FIG. 4.

Thus, it may now be appreciated that collapsible stand 18 is fabricated from only two separate pieces, each lateral side 24 being identical and interchangeable, and each end 22 being identical and interchangeable. Therefore, only two parts need be maintained in inventory to provide for a full repair or replacement kit for stand 18.

Furthermore, with tray 30 removed, collapsible stand 18 folds flatly to a thickness of no more than ½ inch. Chafing dish assembly 10, and in particular collapsible stand 18, can be completely disassembled by removing hinge pins 46 to permit thorough cleaning. Further, unlike open frame supports for conventional chafing dishes, collapsible stand 18 provides a substantial enclosure for heat sources 20 so that chafing dish assembly 10 can be used in outdoor locations where natural winds and drafts might otherwise substantially interfere with the heating capability of the STERNO pots, or even extinguish them.

It should also be evident by the foregoing description that chafing dish assembly is light in weight, but extremely strong. There are no pop rivets, spot welds or screws or other fasteners which are prone to corrode or physically fail used in the construction of chafing dish assembly 10. There are no legs secured to a top frame strap piece as is conventional in most chafing dishes, which require fixtures or connection which may be compromised. Conventional chafing dishes do not stack, or even if foldable, cannot stack or lay flatly within a ½ inch. Further, conventional chafing dishes cannot be disassembled for easy cleaning. Prior art chafing dish assemblies typically lose their rigidity after about 15 to 20 times of usage and are relatively heavy, averaging at least 5½ pounds for the standard chafer frame, whereas collapsible stand 18 of the invention, when fabricated of aluminum plate as disclosed, weighs substantially less.

Because of the sheltered and ovenlike containment provided by collapsible stand 18 for heat sources 20, chafing dish assembly 10 of the invention requires less fuel than conventional chafers and traps the useful heat more efficiently into water pan 16.

Because of the interchangeability of the parts, if in any event any portion of collapsible stand 18 becomes damaged, the entire collapsible stand 18 need not be disposed of, but only the damaged side replaced and reassembled with its mating elements to comprise a fully restored and functional frame.

Because of the strength and simplicity of collapsible stand 18, maintenance of chafing dish assembly 10 is minimal, even when subject to repeated rough handling.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

I claim:

1. A collapsible chafing dish assembly comprising:

a lid;

a food pan coverable by said lid;

a water pan into which said food pan nests;

a collapsible stand into which said water pan nests, said collapsible stand being comprised of four sides forming a rectangular structure, each adjacent side being coupled together by means of a flatly folding hinge; and a nonextensible member temporarily attached to two opposing sides of said rectangular structure and extending therebetween to render said collapsible stand rigid, whereby a rugged, easily stored, collapsible chafing dish assembly is provided.

2. A Chafing dish assembly comprising:

a lid;

a food pan coverable by said lid;

a water pan into which said food pan nests;

a collapsible stand into which said water pan nests, said collapsible stand being comprised of four sides forming a rectangular structure, each adjacent side being coupled together by means of a flatly folding hinge; and means for temporarily rendering said collapsible stand rigid, wherein said means for rendering said stand rigid comprises a rectangular tray temporarily attachable along ends of said tray with opposing sides of said chafing assembly whereby a rugged, easily stored, collapsible chafing dish assembly is provided.

3. A chafing dish assembly comprising:

a lid;

a food pan coverable by said lid;

a water pan into which said food pan nests;

a collapsible stand into which said water pan nests, said collapsible stand being comprised of four sides forming a rectangular structure, each adjacent side being coupled together by means of a flatly folding hinge; and means for temporarily rendering said collapsible stand rigid, wherein said stand has two opposing lateral sides and two opposing end sides, said lateral sides being provided with a plurality of apertures defined therethrough to promote air draft;

wherein said means for rendering said stand rigid comprises a rectangular tray temporarily attachable along ends of said tray with opposing sides of said chafing assembly, whereby a rugged, easily stored, collapsible chafing dish assembly is provided.

4. The chafing dish of claim 3 wherein each of said end sides are provided with a rectangular aperture, said rectangular tray having an end flange at each end of said rectangular tray arranged and configured to slip-fit over an edge of said rectangular aperture defined in each said end side.

5. A chafing dish assembly comprising:

a lid;

a food pan coverable by said lid;

a water pan into which said food pan nests;

a collapsible stand into which said water pan nests, said collapsible stand being comprised of four sides forming a rectangular structure, each adjacent side being coupled together by means of a flatly folding hinge;

means for temporarily rendering said collapsible stand rigid; and a heat source disposable within said stand to provide heat to said water pan, wherein said means for rendering said stand rigid comprises a rectangular tray temporarily attachable along ends of said tray with opposing sides of said chafing assembly and wherein said tray provides support for said heat source to position said heat source appropriately with respect to said water pan and to maintain said heat source in a position spaced above bottom of said stand, whereby a rugged, easily stored, collapsible chafing dish assembly is provided.

6. The chafing dish assembly of claim 3 further comprising a heat source disposable within said stand to provide heat to said water pan wherein said apertures defined in said end sides provide physical access to said heat source within said stand.

7. An improvement in a collapsible chafing dish assembly comprising a stand, water pan disposed and carried by said stand, a food pan disposed in and carried by said water pan and a heat source, said improvement comprising:

a plurality of rigid sides comprising said stand, said sides being rotatably coupled together at their edges so that said stand is collapsible; and at least one nonextensible member temporarily attached to two opposing sides of said stand extending therebetween to render said stand rigid.

8. An improvement in a chafing dish assembly comprising a stand, water pan disposed and carried by said stand, a food pan disposed in and carried by said water pan and a heat source, said improvement comprising:

a plurality of rigid sides comprising said stand, said sides being rotatably coupled together at their edges and collapsible; and means for temporarily rendering said stand rigid, wherein said means for rendering said stand rigid comprises a rigid plate temporarily coupled to opposing ones of said sides and extending between them.

9. The improvement of claim 8 wherein said rigid plate is disposed between opposing sides of said stand to function as a support tray for said heat source, appropriately positioning said heat source beneath said water pan.

10. An improvement in a chafing dish assembly comprising a stand, water pan disposed and carried by said stand, a food pan disposed in and carried by said water pan and a heat source, said improvement comprising:

a plurality, of rigid sides comprising said stand, said sides being rotatably coupled together at their edges and collapsible; and means for temporarily rendering said stand rigid, wherein said sides comprise two identical and interchangeable lateral sides and two identical and interchangeable end sides, and wherein said means for rendering said stand rigid extends between said end sides of said stand and comprises a rigid tray which connects with said end sides along the length of an adjacent end of said tray.

11. The improvement of claim 10 wherein each said end sides is provided with an aperture to permit access to said heat source within said stand when said chafing dish assembly is assembled and wherein said tray is temporarily connected to said end sides along an edge of said aperture defined in each said end side.

* * * * *